US012574999B2

(12) United States Patent (10) Patent No.: US 12,574,999 B2

Van Der Velde (45) Date of Patent: Mar. 10, 2026

(54) TELECOMMUNICATION NETWORK OPERATION

(71) Applicant: SAMSUNG ELECTRONICS CO., LTD., Suwon-si (KR)

(72) Inventor: Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 18/249,699

(22) PCT Filed: Oct. 21, 2021

(86) PCT No.: PCT/KR2021/014859

§ 371 (c)(1),
(2) Date: Apr. 19, 2023

(87) PCT Pub. No.: WO2022/086243

PCT Pub. Date: Apr. 28, 2022

(65) Prior Publication Data

US 2024/0008144 A1 Jan. 4, 2024

(30) Foreign Application Priority Data

Oct. 21, 2020 (GB) ...................................... 2016706
Oct. 19, 2021 (GB) ...................................... 2114939

(51) Int. Cl.
*H04W 76/34* (2018.01)
*H04W 52/02* (2009.01)
(Continued)

(52) U.S. Cl.
CPC ....... *H04W 76/34* (2018.02); *H04W 52/0212* (2013.01); *H04W 52/0232* (2013.01); *H04W 76/15* (2018.02); *H04W 76/25* (2018.02)

(58) Field of Classification Search
CPC ............. H04W 76/34; H04W 52/0212; H04W 52/0232; H04W 76/15; H04W 76/25;
(Continued)

(56) References Cited

U.S. PATENT DOCUMENTS 11,394,511 B2 7/2022 Wu et al.
2019/0069335 A1 2/2019 Wu
(Continued)

FOREIGN PATENT DOCUMENTS

DE 112019006104 T5 8/2021
EP 4013134 A1 6/2022
(Continued)

OTHER PUBLICATIONS

Supplementary European Search Report dated Mar. 4, 2024, in connection with European Patent Application No. 21883311.9, 9 pages.

(Continued)

*Primary Examiner* — Nizam U Ahmed

(57) ABSTRACT

The present disclosure relates to a pre-5th generation (5G) or 5G communication system to be provided for supporting higher data rates beyond 4th generation (4G) communication system such as long term evolution (LTE). Disclosed is a method of controlling the activation or deactivation of a Secondary Cell Group, SCG, in a telecommunication network employing Dual Connectivity, DC, comprising detecting at least one of the following triggers: downlink data inactivity detected by a terminating node; uplink data inactivity detected by the terminating node or detected and reported by a User Equipment, UE; UE assistance information reported to a Master Node, MN or Secondary Node, SN; and mobility to the MN or the SN not supporting the SCG deactivation feature.

17 Claims, 9 Drawing Sheets

(51) Int. Cl.
H04W 76/15 (2018.01)
H04W 76/25 (2018.01)

(58) Field of Classification Search
CPC ............... H04W 52/028; H04W 76/30; H04W
52/0261; H04W 8/24; H04W 72/21;
H04L 5/0053; H04L 5/0098; Y02D 30/70
See application file for complete search history.

(56) References Cited

U.S. PATENT DOCUMENTS

| | | |
|---|---|---|
| 2020/0260496 A1 | 8/2020 | Jin et al. |
| 2021/0274587 A1 | 9/2021 | Jung et al. |
| 2022/0141904 A1 | 5/2022 | Yilmaz et al. |
| 2022/0167445 A1 | 5/2022 | Wang et al. |
| 2023/0217332 A1* | 7/2023 | Pu ........................ H04W 36/362 |
| 2023/0232494 A1* | 7/2023 | Wang .................... H04W 76/15 |
| | | 370/329 |

FOREIGN PATENT DOCUMENTS

| | | |
|---|---|---|
| EP | 4017202 A1 | 6/2022 |
| KR | 20190143782 A | 12/2019 |
| NO | 2022027168 A1 | 2/2022 |
| WO | 2019128581 A1 | 7/2019 |
| WO | 2020123910 A1 | 6/2020 |
| WO | 2020144919 A1 | 7/2020 |
| WO | 2020167170 A1 | 8/2020 |
| WO | 2021027752 A1 | 2/2021 |
| WO | 2021184418 A1 | 9/2021 |
| WO | 2022019821 A1 | 1/2022 |

OTHER PUBLICATIONS

Vivo, "Text proposal for conditional PSCell addition and change", 3GPP TSG-RAN WG2 Meeting #107bis, R2-1912344, Chongqing, China; Oct. 14-18, 2019, 15 pages.

ZTE Corporation et al., "Discussion on conditional PSCell addition/change," 3GPP TSG-RAN WG2 Meeting #111 electronic, R2-2006901, Online, Aug. 17-28, 2020, 11 pages.

Qualcomm Incorporated, "Views on efficient activation/deactivation mechanism for SCells in NR CA", 3GPP TSG-RAN WGI #102-e, R1-2006835, e-Meeting, Aug. 17-28, 2020, 3 pages.

Examination Report dated Sep. 6, 2023, in connection with United Kingdom Patent Application No. 2114939.8, 4 pages.

International Search Report and Written Opinion of the International Searching Authority dated Jan. 27, 2022, in connection with International Application No. PCT/KR2021/014859, 8 pages.

United Kingdom Patent Office, "Examination Report under Section 18(3)," dated Feb. 17, 2023, in connection with GB Patent Application No. 2114939.8, 4 pages.

Vivo, "Ue assistance information for power saving", R2-2000369, 3GPP TSG-RAN WG2 Meeting #109 electronic, Feb. 24-Mar. 6, 2020, 3 pages.

3GPP TS 37.340 V16.3.0 (Sep. 2020) Technical Specification; 3rd Generation Partnership Project; Technical Specification Group Radio Access Network; Evolved Universal Terrestrial Radio Access (E-UTRA) and NR; Multi-connectivity; Stage 2 (Release 16); 83 pages.

3GPP TR 38.875 V0.0.2 (Aug. 2020) Technical Report; 3rd Generation Partnership Project; Technical Specification Group Radio Access Network; Study on support of reduced capability NR devices (Release 17); 18 pages.

* cited by examiner

Figure 7:
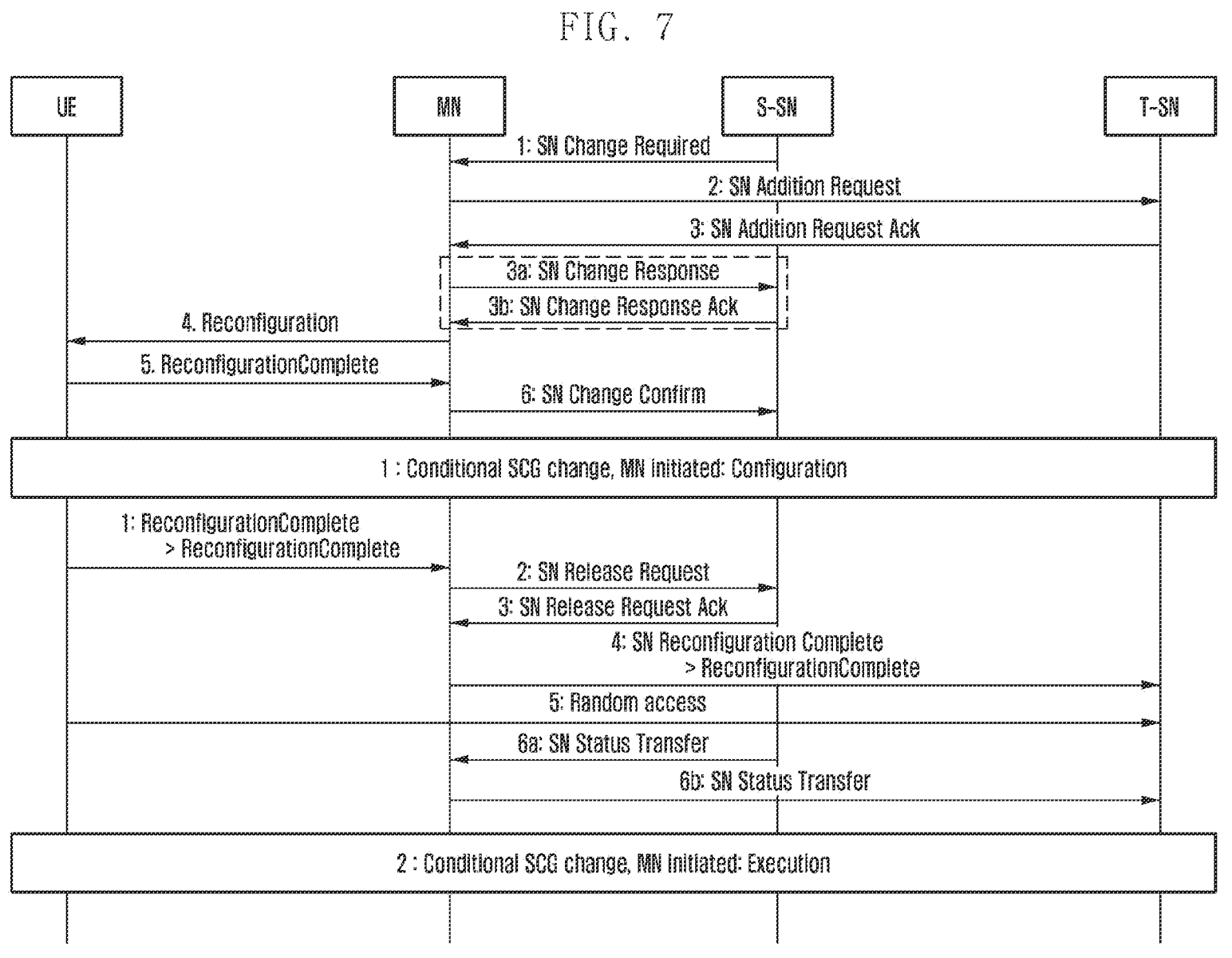

1: SN Change Required

2: SN Addition Request

3: SN Addition Request Ack

3a: SN Change Response

3b: SN Change Response Ack

6: SN Change Confirm

4. Reconfiguration

5. ReconfigurationComplete

1 : Conditional SCG change, MN Initiated: Configuration

1: ReconfigurationComplete
> ReconfigurationComplete

2: SN Release Request

3: SN Release Request Ack

4: SN Reconfiguration Complete
> ReconfigurationComplete

5: Random access

6a: SN Status Transfer

6b: SN Status Transfer

2 : Conditional SCG change, MN Initiated: Execution

TELECOMMUNICATION NETWORK OPERATION

CROSS-REFERENCE TO RELATED APPLICATIONS

This application is a 371 of International Application No. PCT/KR2021/014859, filed Oct. 21, 2021, which claims priority to United Kingdom Patent Application No. 2016706.0 filed on Oct. 21, 2020, and United Kingdom Patent Application No. 2114939.8 filed on Oct. 19, 2021, the disclosures of which are herein incorporated by reference in their entirety.

BACKGROUND

1. Field

The present disclosure relates to Dual Connectivity in a telecommunication network and, particularly, to deactivation of a secondary connection in certain situations.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

In case a User Equipment (UE) is configured with Dual Connectivity (DC), the UE is connected via a Master Cell Group (MCG) to a Master Node (MN) and a Secondary Cell Group (SCG) to a Secondary node (SN). Each node sets the parameters of the cell group it controls, but the nodes interact to ensure that UE capabilities are respected.

An SCG provides the option to achieve high data rates, by providing a secondary data connection to the network. However, maintaining an SCG also involves several activities that consume battery power Power saving techniques have been introduced in order to save power when the amount of data to be transferred decreases, while allowing quick resumption when the data transfer need increases. As an example, in Release 16 of the 3GPP standard, the option to deactivate an SCell was introduced. For such an SCell, the UE does not monitor the Physical Downlink Control Channel (PDCCH), is configured with a dormant Bandwidth Part (BWP) and continues Channel State Information Reference Signal (CSI-RS) feedback. The primary cell of the cell group is still active and used to transfer control related to the deactivated SCell (i.e. by PDCCH in DL and Physical Uplink Control Channel PUCCH in UL).

However, the power saving that can be achieved by deactivating SCells is limited, as the PSCell remains activated. It is possible to reduce power consumption by configuring a large Discontinuous Reception (DRX) cycle, but this increases re-activation delays. Alternatively, the SCG can be released and added again. This involves a relatively large amount of signalling and may also adversely impact the Core Network (CN), although it is possible to maintain SN-terminated Data Radio Bearers (DRBs) using only MCG resources. In any event it is an aim to develop a solution in which an entire SCG can be deactivated temporarily.

Furthermore, there are several different cases of Dual Connectivity, including cases in which MCG and SCG use a different Radio Access Technology. The UE can be configured with an MCG using LTE and an SCG using New Radio (NR). It is an aim of embodiments of this disclosure to address DC cases for which one of the cell groups uses NR. The general term Multi RAT Dual Connectivity (MR-DC) is used to refer to these DC cases. This also includes the case of NR DC i.e. with both MCG and SCG using NR.

MRDC was introduced in 3GPP release 15. Some important procedures related to MRDC concern:

PSCell/SCG or SN addition: initial setup of a secondary cell group. An SCG comprises a PSCell and possible with some additional SCells all controlled by the same SN;

PSCell change, which may or may not involve change of SN (i.e. intra or inter-SN PSCell change, also referred to as SN change)

In 3GPP release 16, conditional reconfiguration was introduced. In this case, the UE is at a first time (T1) configured with a reconfiguration and a condition. If at a second time (T2) the condition is fulfilled, the UE executes the reconfiguration. This was mainly introduced for mobility robustness, as the radio quality may degrade so quickly that it is impossible for the UE to send a measurement report message or for the network to send a Reconfiguration message in response (i.e. the transfer of the messages may fail)

In Release 16, conditional reconfiguration was introduced for 2 cases:

a) CHO: Conditional handover i.e. change of PCell (may involve change of MN)

b) Intra SN SI-CPC: SN initiated conditional PSCell change while SN remains unchanged

SUMMARY

It is an aim of embodiments of the present disclosure to address shortcomings in the prior art, whether presented herein or not.

According to the present disclosure there is provided an apparatus and method as set forth in the appended claims. Other features of the disclosure will be apparent from the dependent claims, and the description which follows.

According to an aspect of the present disclosure, there is provided a method of controlling the activation or deactivation of a Secondary Cell Group, SCG, in a telecommunication network employing Dual Connectivity, DC, comprising detecting at least one of the following triggers:

downlink data inactivity detected by a terminating node;

uplink data inactivity detected by the terminating node or detected and reported by a User Equipment, UE;

UE assistance information reported to a Master Node, MN or Secondary Node, SN; and mobility to the MN or the SN not supporting the SCG deactivation feature.

In an embodiment, in the case where the UE provides assistance information to the network via the MN or SN, this is performed by RRC signalling via SRB1 or another form of signalling via PCell.

In an embodiment, the UE assistance information related to SCG deactivation comprises information related to UL or DL inactivity, overheating, power saving or IDC.

In an embodiment, the UE assistance information can be specific or combined.

In an embodiment, in the event of specific UE assistance information, this is in the form of activity indications per Data Radio Bearer, DRB, and in the case of combined assistance information, this is in the form of a message indicating that SCG deactivation is required.

According to a second aspect of the present disclosure, there is provided a telecommunication network arranged to perform the method of the first aspect.

When reference is made to deactivation in the case of inactivity or other trigger, then the skilled person will understand that this includes activation in response to the same or complementary triggers. For instance, if an SCG is deactivated due to inactivity, it can equally be activated in the event of activity.

According to a third aspect of the present disclosure, there is provided a method of conditional reconfiguration related to one or more of conditional PSCell Addition (CPA), MN initiated Change of PCell (MI-CPC) and S-SN initiated inter SN change of PCell (SI-interCPC).

Preferred features of this aspect are as set out in the appended description.

According to the disclosure, there is improvements in and relating to deactivation of a secondary connection in dual connectivity.

BRIEF DESCRIPTION OF THE DRAWINGS

Although a few preferred embodiments of the present disclosure have been shown and described, it will be appreciated by those skilled in the art that various changes and modifications might be made without departing from the scope of the invention, as defined in the appended claims.

For a better understanding of the disclosure, and to show how embodiments of the same may be carried into effect, reference will now be made, by way of example only, to the accompanying diagrammatic drawings in which:

FIG. 4 shows a message flow related to UE reconfiguration at SCG activation according to an embodiment of the disclosure;

FIG. 7 shows a message flow related to S-SN initiated inter SN change of PCell (SI-interCPC) according to an embodiment of the disclosure;

DETAILED DESCRIPTION

Figure 1:
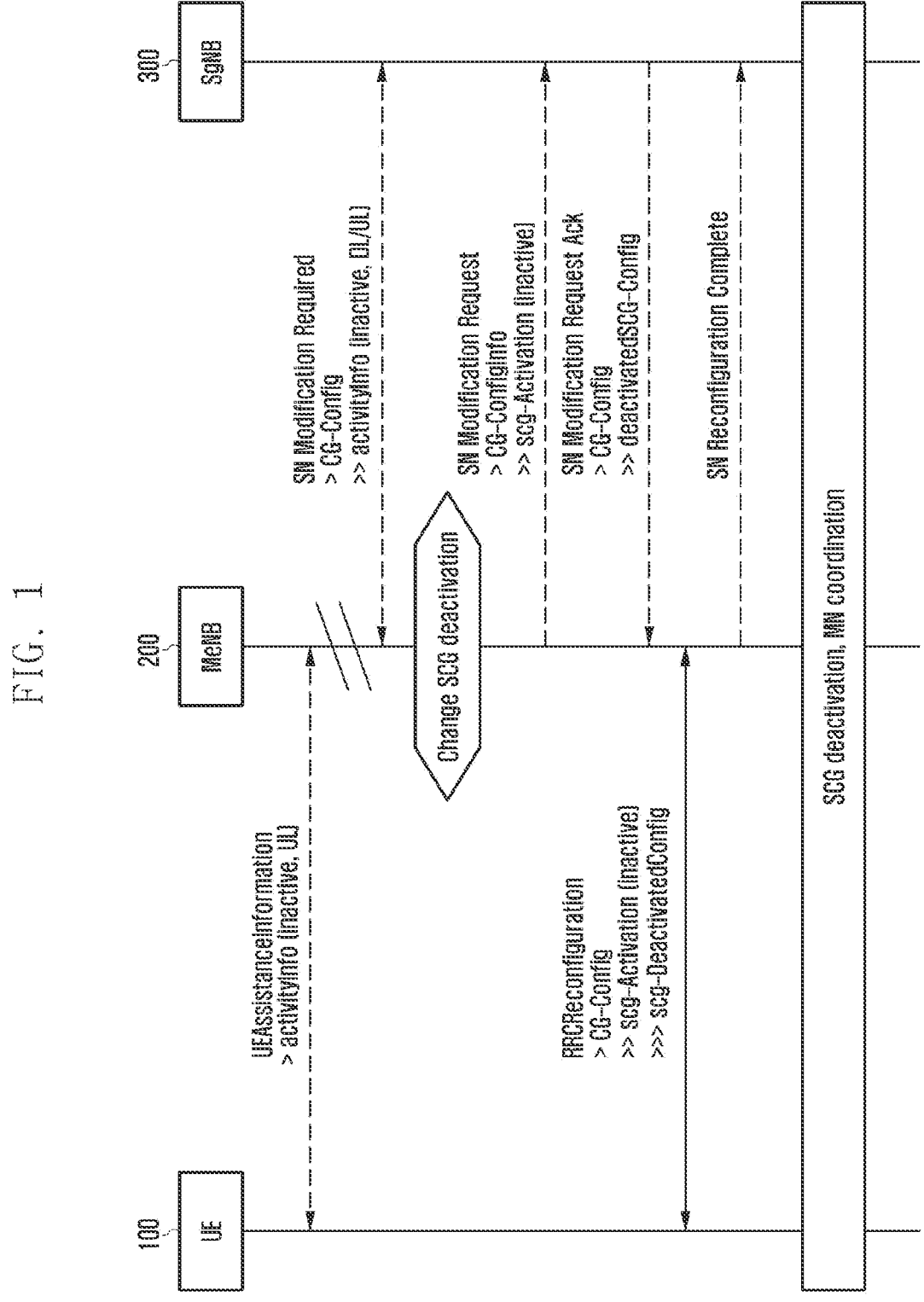
FIG. 1 shows a message flow related to SCG deactivation according to an embodiment of the disclosure.
Figure 2:
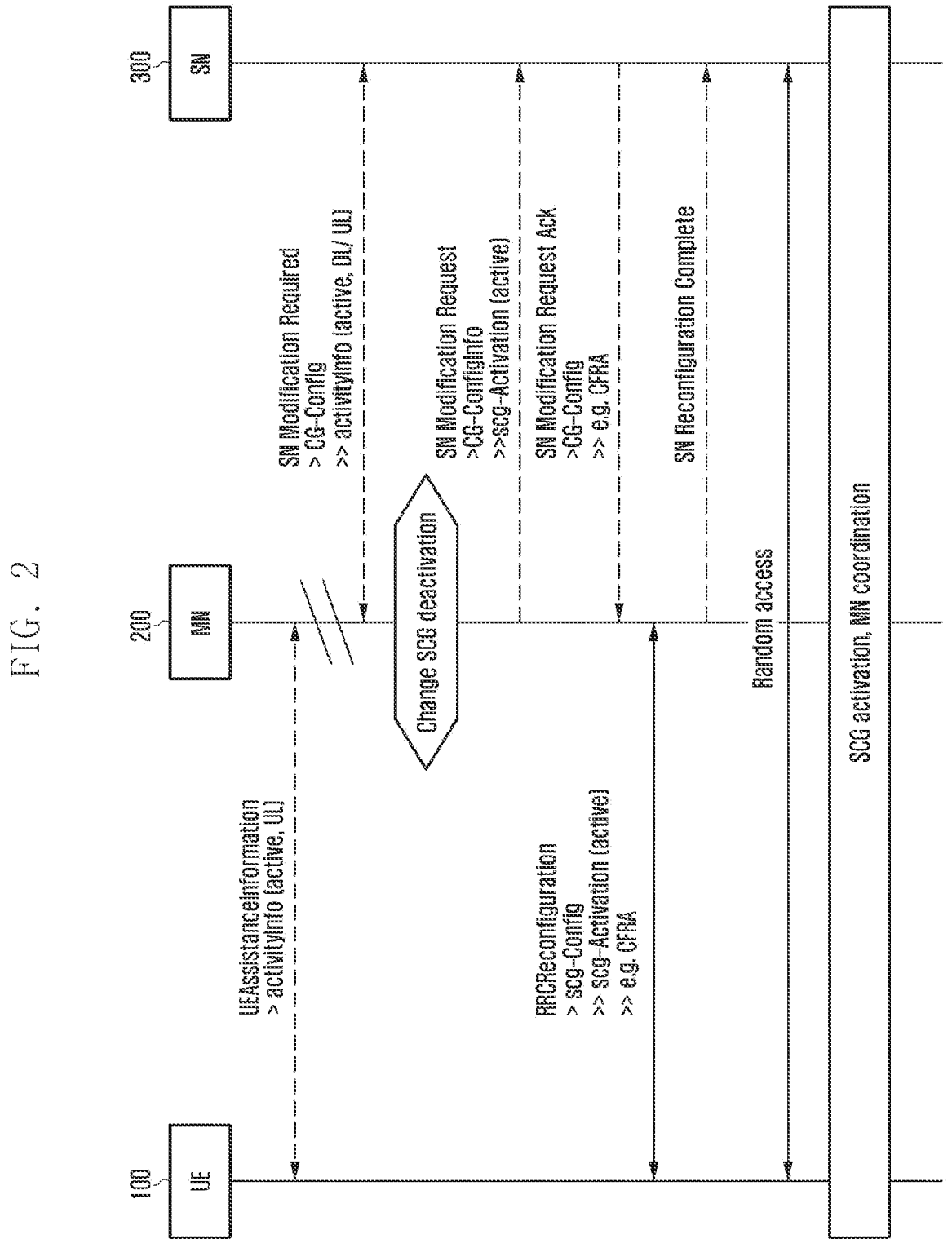
FIG. 2 shows a message flow related to SCG activation according to an embodiment of the disclosure.
Figure 3:
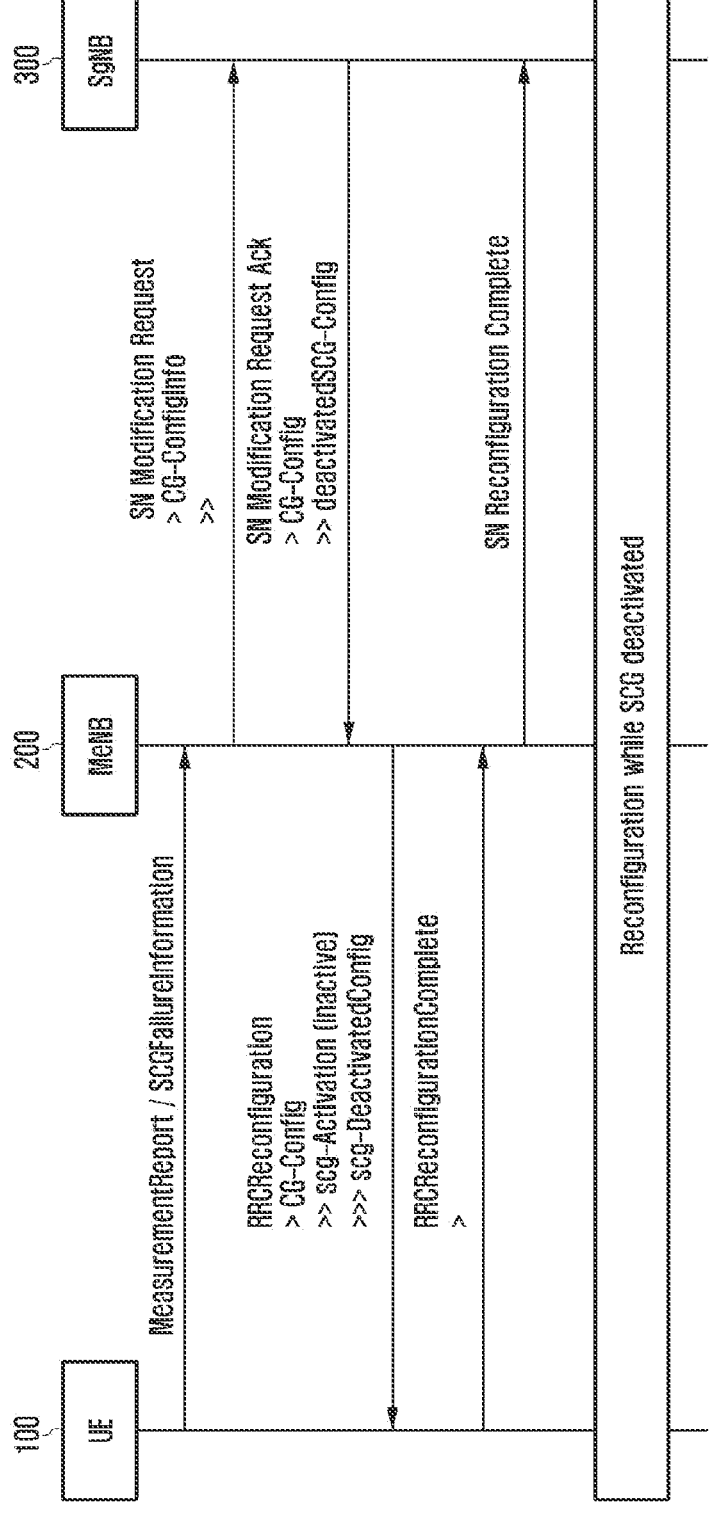
FIG. 3 shows a message flow related to UE reconfiguration while the SCG is deactivated according to an embodiment of the disclosure.

Embodiments of the disclosure relate to differing aspects of a SCell deactivation solution.

A first aspect relates to amongst other things, triggering and conditions for deactivation. The network may initiate SCG deactivation upon one or more of the following triggers:

DL data (in)activity detected by terminating node

UL data (in)activity detected by terminating node or by detected and reported by UE (UE assistance)

UE assistance (overheating, power saving, In-Device Coexistence (IDC)) reported to MN and/or SN Mobility to MN/SN not supporting the SCG deactivation feature The UE may provide assistance to the network to trigger (de-)activation, via the link with MN (RRC via System Resource Block 1 (SRB1) or other signalling via PCell).

The UE assistance for SCG (de-)activation may cover UL and/or DL data (in)activity, overheating, power saving or IDC.

The UE assistance can either be specific (e.g. activity indications per DRB) or a combined/collective one (i.e. SCG activation required).

Radio Resource Control (RRC) signalling (e.g. UL: Measurement Report, UE Assistance, DL: RRCR econfiguration, . . . ) can, but need not, result in change of the SCG activation state. For example, while the SCG is deactivated, such signalling may be transferred via SRB1 and without triggering SCG re-activation.

Embodiments of the present disclosure require coordination of the various entities involved in SCG (de-)activation.

When deciding the SCG deactivation state, the network should consider all relevant triggering aspects, such as:

The SCG should be deactivated when no SCG resources are needed for any of the DRBs that are configured, or to resolve overheating or IDC issues The SCG should be activated when SCG resources are needed for at least one of the DRBs that are configured, provided this does not cause overheating or IDC issues Coordination between MN and SN is required because some DRBs are terminated by MN and some by SN, while only the terminating node has a proper overview of whether SCG deactivation is acceptable or suitable for the concerned DRB. Some UE status reporting may be provided to MN while, other status may be provided to SN. As such, neither MN nor SN may have the full level of information required.

In an embodiment, one node controls the SCG deactivation state, and this can either be the MN or SN.

In an embodiment, the node controlling SCG deactivation interacts with the other node in order to have an overview of all relevant triggers for changing SCG deactivation state. For example, deactivation should occur when no SCG resources are needed for any of the DRBs that are configured, or to resolve overheating or IDC issues. Activation should occur when SCG resources are needed for at least one of the DRBs that are configures, provided SCG activation does not result in overheating or IDC issues In an embodiment, the node controlling SCG deactivation terminates the related signalling e.g. the UE assistance. The signalling may however be transferred via the other node and, if required, forwarded transparently e.g. transferred in octet string container.

In an embodiment, the node not controlling SCG deactivation provides assistance such as regarding activity of DRBs terminated at that node. Such activity indication can either be specific (e.g. activity indications per DRB) or a combined/collective one (e.g. SCG activation required). Such an indication can be signaled within an RRC inter-node message or by a field in Xn/RAN3 defined signalling.

The following relates to managing the configuration of a deactivated SCG. While an SCG is deactivated, its configuration may become obsolete/invalid/improper e.g. because the UE moves to an area covered by another cell. An important consideration is if, when and how the concerned configuration is to be updated.

Regarding the options for updating UE configuration during SCG deactivation and to cope with UE mobility, a number of options are possible:

a) Immediate i.e. UE performs Radio Resources Management (RRM) measurement reporting for the deactivated SCG and based on the received Measurement Report (MR) messages, the network updates (part of) the SCG configuration b) At Failure i.e. UE performs Radio Link Monitoring (RLM)/Radio Link Failure (RLF) for the deactivated SCG and upon detecting RLF it provides an SCG failure report, upon which the network updates (part of) the SCG configuration c) At Re-activation i.e. the network updates (part of) the SCG configuration upon SCG re-activation, possibly based on measurements reported upon re-activation (e.g. early measurements or other feedback)

In an embodiment, the UE performs a quick measurement evaluation upon SCG re-activation, possibly in parallel with a Random Access (RA) procedure. The measurement evaluation may result in abortion of RA by the UE and, if the UE determines that RA should be performed on another cell, a (measurement or failure) report is sent via SRB1, based on which, the network may update the SCG configuration and order a new SCG re-activation. The network can configure the UE to perform such quick measurement evaluation and may provide some associated parameters e.g. reflecting a criterion a PSCell should meet. This may be done by the UE information request procedure, with the UE providing the results of the quick evaluation in the response message.

In an embodiment, the configuration of a deactivated SCG includes a number of different parts (distinguished based on when the configuration needs to be valid) that may be treated differently:

1) Configuration used during SCG deactivation (e.g. measurements to perform, reporting of UL inactivity/UE assistance)

2) Configuration used upon re-activation e.g. Contention Free RACH (CFRA) resources 3) Other e.g. relevant only after the SCG has been re-activated In relation to the above 1) is updated immediately (i.e. based on RRM measurement reporting), while 2) can either be updated at the same time as 1) or upon re-activation. 3) can be either updated immediately/together with 1), upon re-activation or immediately following re-activation e.g. after retrieval of (early) measurement results For 3) above, there are several options regarding the handling of the configuration during and upon/following re-activation:

a) the UE continues use of the existing configurations, but the network may update actual values upon and during de-activation as well as upon re-activation. This option is suitable e.g. for measConfig, conditional reconfigurations for change of PSCell b) Suspend, but resume unchanged, upon re-activation (or use as baseline for delta) e.g. L1/L2 configurations are kept by UE but procedures clarify that UE will not act while SCG is deactivated e.g. suspend CSI-RS measurement reporting c) Release and add (full signalling) upon reactivation d) Set configuration parameters upon deactivation and release upon re-activation e.g. parameters relevant only during SCG deactivation The operations as defined above may involve:

1) the network using existing signalling options e.g. to release configuration not relevant in the deactivated state 2) specification of (autonomous) actions that UE may perform in particular cases e.g. upon SCG deactivation (i.e. rules in procedural specification)

Configurations requiring the actions covered in the above may include:

SN configured measurements not relevant for a deactivated SCG e.g. not related to (PSCell) mobility Conditional reconfigurations to change the PSCell (CPC) e.g. MN configured for load balancing purposes UE assistance, e.g. concerning SCG related power saving In certain cases, the network may configure or keep (e.g. at resumption from inactive state) an SCG mainly in order to avoid latencies involved, in case it would defer configuration until there is a need given the data to be transferred. To facilitate this, the network would sets the initial state e.g. to deactivated. To determine which initial state is appropriate, UE assistance is beneficial. For DRBs having MCG resources, the UE may have better understanding of the need to reactivate SCG, or it may take the network longer to determine this.

In an embodiment, the UE provides assistance to enable network to optimally set initial state of SCG. This can be provided for different cases e.g. upon initial configuration of an SCG, upon keeping an SCG when moving from inactive to connected (i.e. upon connection resumption). It can re-use the framework of the UE assistance signalling as used to indicate UL data for RB only configured with SCG resources.

There may however be difficulties in providing the UE assistance. It may be difficult to provide the information when requesting resumption, meaning the network may have to blindly set an initial state until receiving the UE input. It may be difficult for the UE to provide assistance regarding (UL) data (in)activity prior to SCG configuration as the UE may have to provide the information agnostic of which DRBs the network might configure SCG resources for.

The network may have configured fast MCG recovery when initiating SCG deactivation i.e. the timer, T316, may be running. There are several options regarding what to do upon SCG deactivation.

There are options regarding fast MCG recovery upon SCG deactivation and thereafter, including:

Fast MCG recovery is released i.e. T316 is stopped (so MCG failure will result in re-establishment). This is either handled by the network using regular signalling or by the UE i.e. UE autonomous release upon SCG deactivation (rule in procedural specification); or Fast MCG recovery continues and upon MCG failure, the UE performs re-establishment and stops T316, or the UE initiates SCG reactivation e.g. by RA to PSCell and reports MCG failure.

The following relates to FIGS. 1 to 4 which illustrate in more detail, certain signalling between UE 100, MN 200 and SN 300. MN 200 may refer to MeNB or MCG, and SN 300 may refer to SgNB or SCG as appropriate.

FIG. 1 shows a case in which MN 200 controls SgNB 300 deactivation i.e. the MN handles input from SN (DL, UL data for SN terminated DRBs) and UE (UL data, UE assistance e.g. overheating, IDC). Some relevant UE assistance may be provided via SRB3, which the SN then forwards to MN, which then decides whether to deactivate SCG. If so, the MN informs SN e.g. using the SN modification request procedure as shown and the MN informs the UE e.g. using RRC reconfiguration message/procedure.

Upon deactivation of the SN, the MN may configure the UE, for example, to modify or provide a configuration relevant while the SCG is deactivated (e.g. regarding actions to perform concerning deactivated SCG) or relevant upon SCG activation. Such a configuration may include parts generated by the MN 200 and parts generated by SN 300.

This may involve one or more of: changes to existing (general) configurations e.g. measConfig (measurements to perform concerning deactivated SCG), CFRA resources to use upon activation; configuration specific for deactivated SCG e.g. reporting of UL inactivity (UE assistance); and L1/L2 configuration might be kept unchanged, with procedures changed to clarify that UE will not act e.g. suspends CSI-RS measurement reporting.

In the case where the SN coordinate SCG deactivation, the sequence is largely similar but there are some differences, such as the MN provides input to the SN e.g. information regarding data (in)activity for MN-terminated DRBs. This may be done by the SN modification required procedure. Further, UE assistance may be provided via SRB1, which the MN forwards to the SN.

The message sequence upon re-activation of the SCG can be somewhat similar to that shown in FIG. 1 and is illustrated in FIG. 2, again for the MN controlled case.

As in the case of deactivation shown in FIG. 1, the controlling node needs to consider all relevant triggers and take a coordinated action. For instance, arrival of DL or UL data for an SN-terminated DRB can initiate reactivation, but this may be inappropriate when/if the UE is still overheated or experiences IDC for the SCG.

Upon re-activation, the UE may perform a quick measurement evaluation to determine if the configured PSCell is appropriate and, if not, it may abort RA and report measurement information to the network.

The message sequence used to reconfigure the UE 100 while the SCG 300 is deactivated is illustrated by an example as shown in FIG. 3, again for the MN controlled case.

The measurement report is terminated by the MN 200 and the MN initiates reconfiguration towards the UE 100. The reconfiguration may include SN 300 generated configurations, and accordingly the MN may initiate the SN modification request procedure prior to initiating the Reconfiguration towards the UE.

Figure 4:
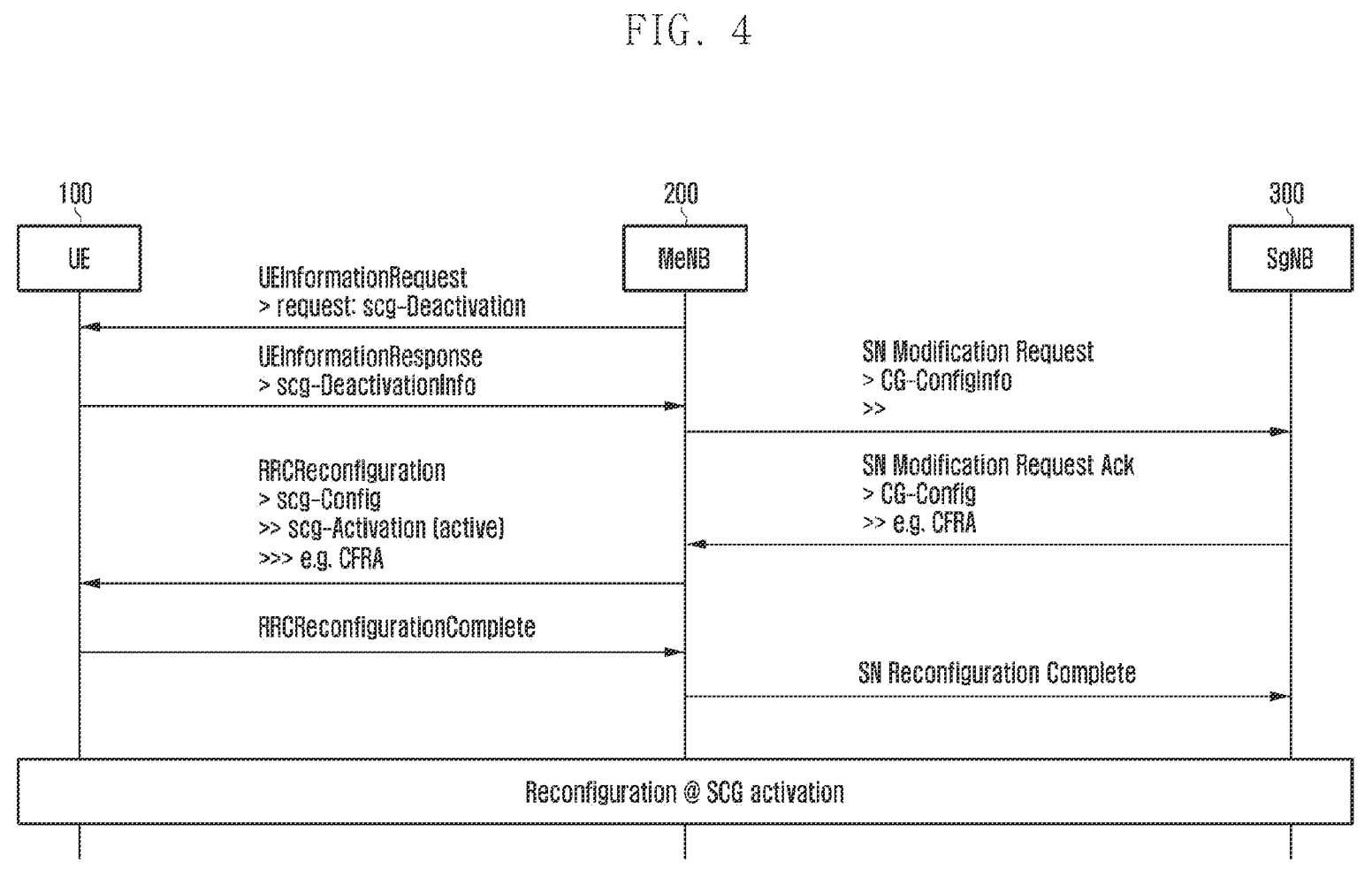

As indicated previously, the UE 100 may perform a quick measurement evaluation upon SCG 300 re-activation. This may be initiated by the network as shown in FIG. 4.

Before deactivating the SCG 300, the network requests the UE 100 to perform a quick measurement evaluation. This may be done by the UE information request procedure. Upon completing the evaluation, the UE provides the result to the network.

The network may use the result to reconfigure the SCG configuration i.e. to configure another PSCell and/or to update some SCG configuration e.g. the RA resources. As an alternative, a parallel operation may be performed, such as SCG re-activation, which may start while the quick measurement evaluation is ongoing Embodiments of the disclosure provide advantages over the prior art, including:

providing different triggers for SCG (de)activation, not limited to data (in)activity defining signalling, both to change SCG deactivation state as well as reconfigurations while the SCG is deactivated covering the UE (measurement and other) assistance providing different options regarding the responsibilities of the nodes and their interaction, taking into account all relevant triggers providing different options regarding the handling of deactivated SCG configuration information i.e. which configurations require which handling as well as when and how the actions may be performed defining responsibilities of the nodes and their interaction, taking into account all relevant triggers providing UE assistance for setting initial SCG state for different relevant cases as well as interactions with some other features like MCG fast recovery Embodiments of the disclosure provide a comprehensive solution without becoming overly complex, thereby resulting in ease of implementation without unduly burdening the network with computational or signalling demands.

In Release 17, conditional reconfiguration is expected to be added for a number of additional cases:

a) CPA: Conditional PSCell addition b) MI-CPC: MN initiated conditional PSCell change involving change of SN. It was previously agreed that MN only initiates SN mobility for load balancing i.e. that MN can only initiate change to a PCell on another SN (as the SN handles the regular SN mobility)

c) SI Inter-SN CPC: SN initiated conditional PSCell change involving change of SN The additional Release 17 conditional reconfiguration cases should ideally follow as far as possible what is defined for the non-conditional variant, re-use the general principles of the Release 16 conditional reconfiguration cases and not result in a consistent and not overly complex solution.

Achieving the above poses problems, in particular because the case of SI Inter-SN CPC has particular issues. An embodiment of the disclosure provides a signalling approach developed with this case in mind that is subsequently applied also for the other cases described here. It may be considered that the embodiments of the disclosure are not entirely consistent with Release 16 CPC, but the overall result provides the best option for meeting the above objectives overall.

Embodiments of the disclosure relate to the conditional reconfigurations intended to be introduced in Release 17 and includes the following items, described in more detail later.

In a first embodiment, the RRC Reconfiguration signalling should support:

a) Both MN and SN generated reconfigurations can be performed upon execution of conditional reconfiguration, at least for the case of CPA and inter-SN CPC (i.e. if candidate concerns PSCell and even for the case CPC is initiated by S-SN)

b) When the conditional reconfiguration is included in the MN generated message, the condition can be generated by SN and refer to the SN configured measurement config. The SN generated condition may be configured by a separate field and carried within an octet string container In a second embodiment, the target SN having a say in PSCell selection either by:

a) the target node influences the condition that is set by a node configuring the conditional reconfiguration i.e. negotiation between concerned nodes performed at configuration time is introduced for the execution conditions b) the target node configures the UE with an additional condition and the UE executes the conditional reconfiguration only if this additional condition is also fulfilled. It should be noted that prior to execution, the target node cannot influence the measurements that the UE performs. This means that the additional condition set by the target can only refer to measurements configured by MN or S-SN (CPC)

In a third embodiment, determination of the conditional reconfiguration type or whether the candidate concerns PCell or PSCell can be done by:

a) Introducing a field by which the network can indicate the conditional configuration type In a fifth embodiment, support is provided for direct communication between SNs, at least for the case where S-SN changes the SCG configuration and needs to inform the T-SN as the conditional reconfiguration set by T-SN may be affected. Direct communication between S-SN and T-SN is advantageous because direct communication enables use of SRB3 and thereby reduces latency and the MN involvement is only required upon initial configuration of a candidate on another SN.

A general assumption is that Release 17 conditional reconfiguration cases will follow as closely as possible what is defined for the non-conditional variant, while also reusing the general principles of the Release 16 conditional reconfiguration cases.

The following table, Table 1, provides a brief overview of the RRC signalling used for Release 16 conditional reconfiguration. It is important to note that the reconfiguration performed when the condition is met, is all contained within field conditionalReconfiguration. It can be used to configure a number of candidates each with a condition and a reconfiguration (condRRCReconfig). Further, reconfiguration messages can include information generated by another node. Such information is typically carried within an octet string container, i.e. embedded, that facilitates that the node sending the Reconfiguration message can forward the information transparently without having to comprehend or decode it. In some cases, multiple levels of such octet string embedding are used.

TABLE 1

| Message structure for R16 conditional reconfiguration cases | | | |
|---|---|---|---|
| CCase | Outer message | 1$^{st}$ embedding level | Remarks |
| CHO | S-MN generated reconfiguration message including conditionalReconfiguration, containing 1$^{st}$ embedding level | T-MN generated reconfiguration message | Condition set by MN/refer to PCellNo restrictions set regarding contents of T-MN generated message i.e. could include SCG (but performed blindly/ based to PCell condition) |
| CPC, SRB1 | MN generated message including xx-SecondaryCellGroupConfig, containing 1$^{st}$ embedding level | SN generated reconfiguration message, including conditionalReconfiguration | Conditions set by SN/concern PSCellAt execution, UE only performs SN generated reconfigurations |
| CPC, SRB3 | SN generated reconfiguration message, including ConditionalReconfiguration | Not applicable | Same as previous row | b) Specify a rule by which the UE determines the conditional configuration type

In a fourth embodiment, the MN may inform S-SN about any MN initiated CPC it configures, which appear necessary because:

a) Restrictions may be specified regarding the simultaneous configuration of conditional reconfiguration e.g. that when MN configures MI-CPC, certain SN initiated cases are not allowed anymore b) If S-SN subsequently modifies the SCG config, the conditional reconfiguration set by T-SN may be affected. This means the T-SN should be informed/ contacted.

The main points shown in the table concern the reconfigurations performed at execution, namely:

CHO: both MN and SN generated reconfigurations can be performed, while the condition is MN generated and refers to PCell and the MN configured measurement config CPC: only SN generated reconfigurations can be performed while the condition is SN generated and refers to PSCell and SN configured measurements For the conditional reconfigurations introduced in Release 17, some changes are required to the standards regarding the RRC Reconfiguration signalling:

a) Both MN and SN generated reconfigurations can be performed upon execution of conditional reconfiguration, at least for the case of CPA and inter-SN CPC (i.e. if candidate concerns PSCell and even for the case CPC is initiated by S-SN)

b) When the conditional reconfiguration is included in the MN generated message, the condition can be generated by SN and refer to the SN configured measurement config. The SN generated condition may configured by a separate field and carried within an octet string container Note that a) above is the same as in case of CHO. The use for CPA and CPC is however not suggested in the art as it differs from the signalling approach used for the Release 16 case when candidate concerns PSCell. Use of such an approach is however well motivated as described below. Further the combination of a) and b) is clearly different from CHO, where the condition is MN generated.

With regard to point a), above, for CPA and inter-SN CPC, the UE needs to be provided with the MN generated sk-Counter in order to derive a new secondary KgNB that may be used for SRB3 or SN terminated DRBs. In the case of inter-SN CPC, it may be that T-SN is unable to admit some of the SN terminated DRBs that are configured. In such a case, it is desirable to support that the concerned DRBs can be reconfigured to MN terminated DRBs. It is preferable to perform this change only at execution time, to avoid that such a change is done even if the conditional reconfiguration for the concerned candidate is never executed. The latter may result in reduced performance whenever there are admission issues for one conditional reconfiguration candidate that is configured.

It should be noted that in case of MRDC, the MN and SN may share some of the UE capabilities and that the nodes interact for this (capability coordination) purpose. For instance, the band combination and/or feature set combination used by MN/for MCG may need to be adjusted to facilitate configuration of the SCG configuration included in the condRRCConfig. This means that in the case of CPA and CPC, the MN configuration may need modification to ensure that, together with the SCG configuration applied at execution time, it respects the UE capabilities. It is preferable to avoid that MN configuration should be restricted prior to conditional reconfiguration execution. In other words, if this cannot be delayed until execution, MCG has to be restricted such that it in conjunction with every conditional CPA/CPC candidate that is configured, UE capabilities are respected. This would result in serious performance loss With regard to point b) above, in the case of inter SN initiated inter-SN CPC (SI inter-SN CPC), the conditional reconfiguration can include MN generated reconfigurations and hence the message structure needs to be similar to the case of CHO, i.e. with the outer Reconfiguration message including field conditionalReconfiguration, and with the condRRCReconfig of each candidate carrying an MN generated Reconfiguration message. As the SN handles the SCG mobility, the execution conditions should be set by S-SN (possibly with option of target SN to have a say also, as described later). The MN, in general, does not need to comprehend the information generated by SN, because, amongst other features, it uses another Radio Access Technology than the SN. This should not only apply for the SN generated configuration (e g. cellgroupConfig, measConfig, otherConfig, radioBearerConfig), but also for the SN generated execution condition. This is supported be adding a separate field, used for transferring the SN generated execution condition towards the UE, carried within an octet string container to make it possible for the MN to forward the information transparently i.e. without the need to comprehend or decode and re-encode the information.

In the case of non-conditional PSCell addition or change, the target SN is provided with a set of candidate cells with for each the measurement results. The target SN then decides which of the candidates to actually configure as PSCell. For the corresponding conditional reconfiguration, it is desirable for the target SN to also have a say in the selection of the PSCell. The target SN (T-SN) may be provided with measurement results when conditional reconfiguration is configured (i.e. at configuration time). However, this may not be useful as concerned results do not reflect the situation at execution time. There are two options by which T-SN can have a say, while taking measurements conditions at execution time into account:

a) The target node influences the condition that is set by node configuring the conditional reconfiguration i.e. negotiation between concerned nodes performed at configuration time is introduced for the execution conditions b) The target node configures the UE with an additional condition and the UE executes the conditional reconfiguration only if this additional condition is also fulfilled.

There is an issue with option b) above in that the evaluation of the additional condition has to be done immediately following configuration of the conditional reconfiguration. However, any conditional RRC configuration (including measConfig) that T-SN sets, is only applied upon execution. This suggests that the additional configuration should rather refer to measurements configured by MN or S-SN (CPC). However, such a node (MN or S-SN) would not typically include the conditional reconfiguration related conditions that T-SN would like to add (as that is the sole reason for SN to add. i.e. option b) above) would mean that T-SN would anyhow have to negotiate with MN/S-SN in order for the conditions to be added, in which case it becomes similar to option a) above.

Alternatively, the concerned part of the T-SN configuration is applied by the UE in between configuration and execution of the conditional configuration. In other words, such an option involves the definition of a new type of conditional RRC reconfiguration.

The following table, Table 2, provides an overview of the resulting RRC Reconfiguration signalling used for the Release 17 conditional reconfiguration cases.

TABLE 2

| Resulting message structure for Release 17 conditional reconfiguration cases | | | |
|---|---|---|---|
| CCase | Outer message | 1$^{st}$ embedding level | Remarks |
| CPA | MN generated reconfiguration message including conditionalReconfiguration, | MN generated reconfiguration message including: MN reconfigurations e.g. | Candidate concerns PSCell. Restrictions may |

TABLE 2-continued

| | | Resulting message structure for Release 17 conditional reconfiguration cases | |
|---|---|---|---|
| CCase | Outer message | 1st embedding level | Remarks |
| | containing for each candidate > condReconfigId (set by MN) >Reconfiguration (re-using existing condRRCReconfig): see 1st embedding level >MN generated condition, referring to MN measurement config (re-using existing condExecutionCond) (condition using event A4 or B1) | sk-Counter, xxCellGroupConfig and radioBearerConfigN SN reconfigurations by field xx-SecondaryCellGroupConfig and by radioBearerConfigM | be specified regarding contents embedded Reconfiguration message e.g. no change of PCell/ of MCG cells SN can influence PSCell decision, either by negotiation with MN or by an additional condition (would refer to MN configured measConfig) |
| MI-CPC | Same as for CPA | Same as for CPA (SN now concerns T-SN) | Same as for CPA, but Additional SN condition now refers to S-SN generated measConfig (SN now concerns T-SN) |
| SI-CPC | Same as for CPA, except > S-SN generated condition, referring to SN measurement config (by separate field, carried in octet string to facilitate transparent forwarding by MN) (condition using event A3 and/or A5) | Same as for MI-CPC | Same as for MI-CPC |

The existing standards support the field condRRCRecon-fig and the content required according to the above. i.e. in (NG)EN-DC, the field contains LTE reconfiguration message, while, in other cases, it contains an NR reconfiguration message.

For field condExecutionCond, changes are required to support event A4 and B1 for CPA and MI-CPC. This may enable the possibility to use of A3+A4 for CHO and CPC.

Determination of conditional reconfiguration case/ whether candidate concerns PCell or PSCell may be done by:
a) Introducing a field by which the network can indicate the conditional configuration type
b) Specifying a rule by which the UE determines the conditional configuration type A further question is how the UE determines whether the candidate concerns a PCell or PSCell. It should be noted that the network sets the contents of the conditional reconfiguration reflecting the particular conditional reconfiguration case as illustrated below. Hence, the UE can determine from the contents of condRRCReconfiguration whether the conditional reconfiguration concerns a change of a PCell or change/addition of a candidate PSCell (and conditions would be set according to the case/concerned type of candidate). In other words, there is no real need for the network to signal an additional field to assist the UE in determining the nature of the conditional reconfiguration. However, a field may be introduced to ease UE behaviour and to simplify the specification.

Note that the UE can also infer from the signalling whether the condition refers to MN or SN configured measConfig. The field refers to SN generated measConfig if the condition is in a field generated by SN e.g. xx-SecondaryCellGroup or in the condition newly introduced according above. No additional signalling may be needed, but as set out above, an additional field may ease specification and implementation.

TABLE 3

| | Message contents for conditional reconfiguration cases | | |
|---|---|---|---|
| | MN reconfiguration/ MCG | SN reconfiguration/ SCG | Remarks |
| CHO | Change of PCell | SCG addition, modification or release | Addition/change of SCG cells would be blind/based on PCell conditionExisting condition used, referring to MN configured measConfig |

TABLE 3-continued

| | Message contents for conditional reconfiguration cases | | |
|---|---|---|---|
| | MN reconfiguration/ MCG | SN reconfiguration/ SCG | Remarks |
| CPC R16 | Not applicable (not signalled) | Change of PCell | Addition/change of other SCG cells would be blind/based on PSCell conditionExisting condition used, referring to SN configured measConfig |
| CPA | No PCell change/ change of MCG cells (but reconfiguration possible) | PSCell addition | Addition of other SCG cells would be blind/based on PSCell conditionExisting condition used, referring to MN configured measConfig |
| MI-CPC | Same as for CPA | Same as for CPA | Addition/change of other SCG cells would be blind/based on PSCell conditionExisting condition used, referring to MN configured measConfig |
| SI-CPC | Same as for CPA(condition set by SN generated field) | Same as for CPA | Same as for MI-CPC Existing condition used, referring to MN configured measConfig |

In the following, message sequences are described details are provided, in particular, for messages that are affected compared to the prior art, such as changes to the message content or handling.

In the case of configurig multiple candidates, one general aspect is that the network may configure multiple PSCell candidates, which can be on the same or on different target SNs. When there is a need to setup (add), modify or cancel (release) multiple PSCell candidates on a given T-SN, this can either be done by:

a) a single Xn message including the multiple candidates or b) multiple Xn messages, each including a single candidate It is noted that the Xn message used to add or configure a PSCell/SN includes a single RRC inter-node message. The message may however contain multiple candidate cells, from which the target SN can select one to become PSCell. It would be inappropriate to hide the multiple candidates within the RRC inter-node message. In other words, visibility within Xn signalling is needed, as there are some Xn candidate specific Xn parameters to be exchanged e.g. to indicate the execution likelihood. Moreover, such visibility seems beneficial to facilitate subsequent modification or cancellation, as well as to facilitate forwarding Xn messages to the appropriate T-SN e.g. at execution time. Moreover, it seems to ease the handling in case the target SN only admits a subset of the candidates included in the message. This may be particularly relevant for the case of SI-CPC when the MN generates the outer Reconfiguration message towards the UE.

Note that for CHO preparation, approach b) above is adopted mainly in order to simplify both specification and implementation.

In case the UE is configured with PSCell candidates on multiple T-SNs, the network node controlling conditional reconfiguration (typically the MN) needs to contact, at execution time, the appropriate T-SN e.g. to forward a Reconfiguration complete message. The relevant complete message provided by the UE may include details of the PSCell candidate for which CPA/CPC is executed, but the MN may be unable to acquire this information, as it is not required to comprehend the concerned complete message (that may be coded in accordance with a different Radio Access Technology) As the sequences show, the UE provides the Reconfiguration message for the T-SN embedded within a ReconfigurationComplete message that concerns a response to the first embedded Reconfiguration message (i.e. the MN generated Reconfiguration contained in the conditionalReconfiguration for the concerned candidate). In such a case, the MN can infer from the transaction identity of this outer Reconfiguration Complete message the identity of the T-SN.

Figure 5:
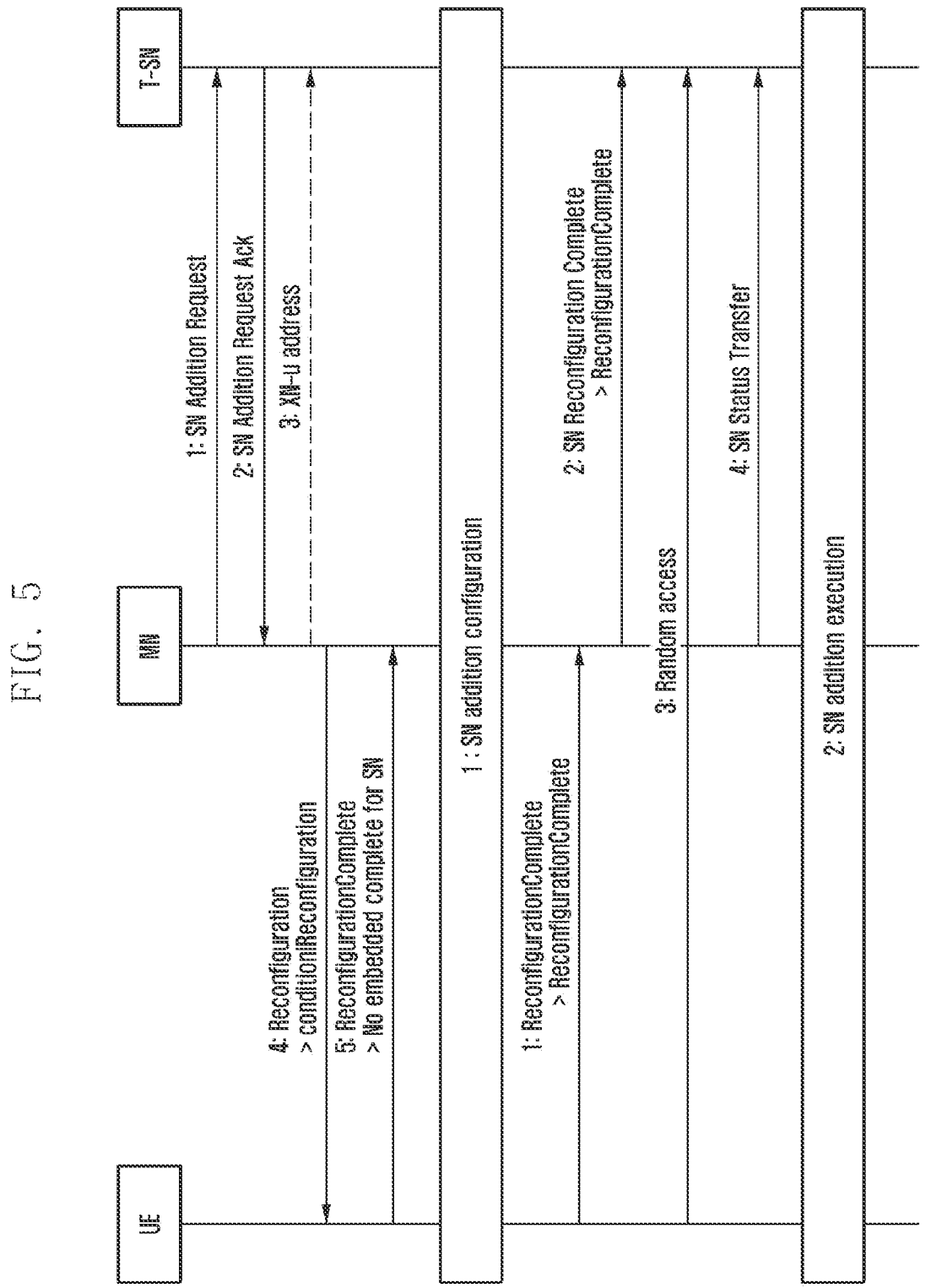
FIG. 5 shows a message flow related to conditional PSCell Addition (CPA) according to an embodiment of the disclosure.

FIG. 5 illustrates CPA configuration and execution according to an embodiment of the disclosure.

Configuration (described for the case where at most one candidate is contained an Xn message) is shown in the upper part of FIG. 5, immediately above "1: SN addition configuration" and the steps involved are described below.

The SN ADD REQ (Msg 1)/SN ADD REQ ACK (Msg 2) message may be extended to cover the cases where the target SN has a say in PSCell selection with changes (per option):

a) The RRC internode messages CG-ConfigInfo and CG-Config that are contained in Msg 1 and Msg 2 respectively, may be extended to cover coordination/ negotiation of the execution condition b) The RRC internode messages CG-Config that is contained Msg 2, may be extended to transfer an additional T-SN generated execution condition The SN ADD REQ (Msg 1)/SN ADD REQ ACK (Msg 2) message may be extended with a CPC trigger field, indicating it concerns initial setup rather than subsequent modification of a CPC candidate, and the estimated arrival probability The Reconfiguration message containing the configuration to be performed at execution time, affects SN ADD REQ ACK (Msg 2) i.e. the CG-Config that is contained Msg 2 in this message carries the SN generated parts of the conditional reconfiguration The Reconfiguration message containing the configuration to be performed at execution time, is carried by Msg 4, embedded in conditionalReconfiguration (within condReconfigurationToApply/condRRCReconfig in a CondReconfiguration ToAddMod entry). This first embedding level contains an MN generated Reconfiguration message, including a target SN generated Reconfiguration message within xx-SecondaryCellGroupConfig, the 2nd embedding level, and possibly an SN rengenerated radioBearerConfigX (alternative is to signal this within the SN generated Reconfiguration message Execution is shown in the lower part of FIG. 5, immediately above "2: SN addition execution".

In Msg1, the UE sends a ReconfigurationComplete message that is a response to the first embedded Reconfiguration message that was MN generated. The message includes a response to the 2nd embedded Reconfiguration message that was generated by SN. The MN uses the transaction identity of the outer ReconfigurationComplete message to determine which SN to forward the embedded ReconfigurationComplete to.

Figure 6:
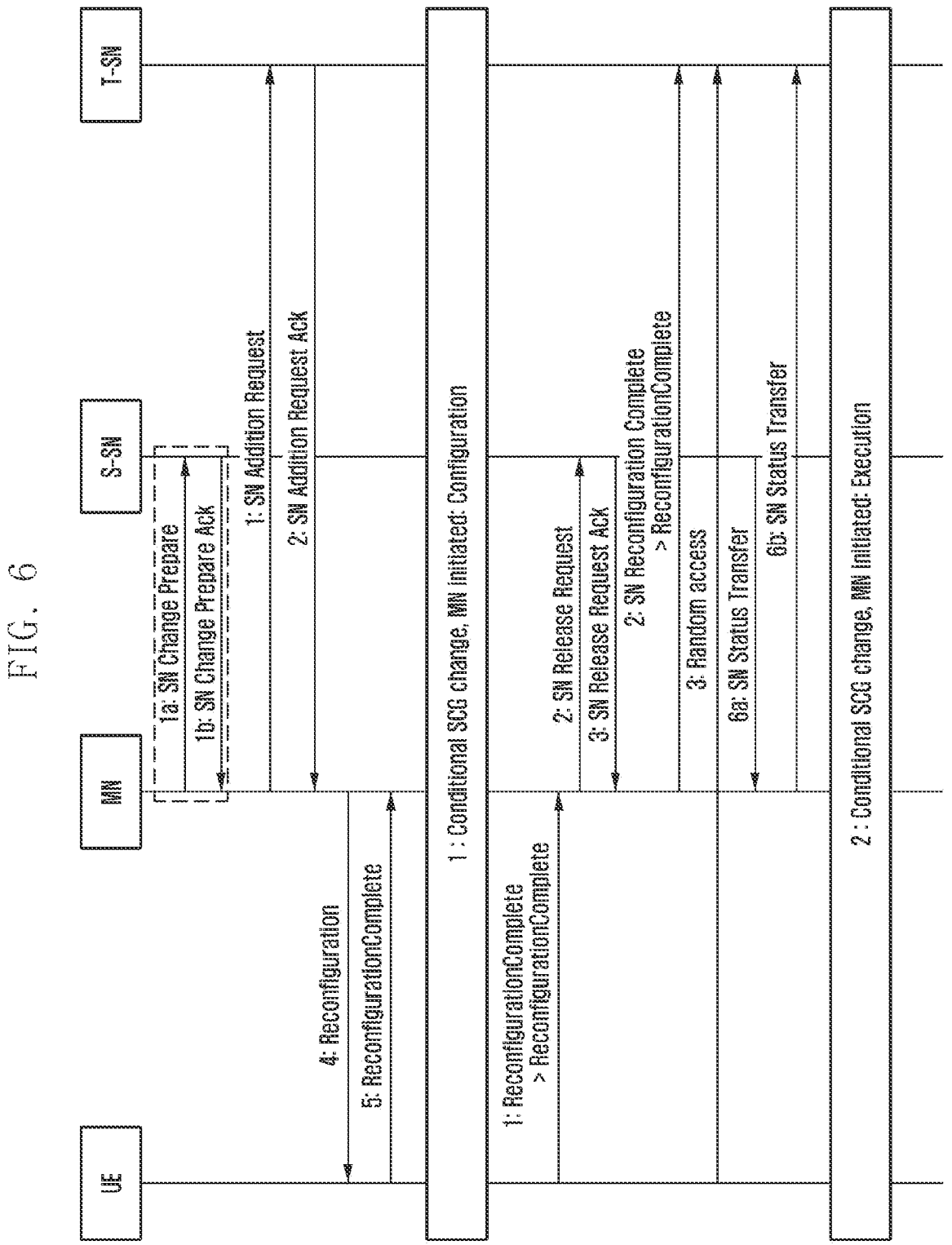
FIG. 6 shows a message flow related to MN initiated Change of PCell (MI-CPC) according to an embodiment of the disclosure.

There may also be a need to modify a prepared CPA candidate i.e. in-between configuration and execution. This can either be initiated by MN as a change of MN generated configuration which may affect the T-SN generated configuration of the CPA candidate or it may be initiated by T-SN e.g. when there is a need to modify the T-SN generated configuration of the CPA candidate Further, the sequence/procedure for the 1st case i.e. the MN initiated modification is similar to the one for the initial reconfiguration. The sequence for the 2nd case i.e. T-SN initiated case is similar to the known SN Modification procedure—SN initiated with MN involvement. Some changes may however be required to reflect that the modification now concerns a candidate PSCell rather than an actually used SCG configuration FIG. 6 shows a message flow in connection with MI-CPC configuration and execution As indicated previously, MN can initiate inter-SN change merely for load balancing purposes. FIG. 6 shows an example of a message sequence for the case of CPA, covering both configuration and execution.

Configuration is shown in the upper part of FIG. 6, immediately above "1 Conditional SCG Change, MN initiated: Configuration"

The MN may contact S-SN prior to initiating SN change (i.e. by step 1a/1b) to acquire the current SN configuration that is to be forwarded to T-SN as it will be the baseline for the conditional RRC reconfiguration (delta signalling) generated by T-SN and/or to inform S-SN about CPC, which is needed because restrictions may be specified regarding the simultaneous configuration of conditional reconfiguration e.g. that when MN configures MI-CPC, certain SN initiated cases are not allowed anymore and/or if S-SN subsequently modifies the SCG config, the conditional reconfiguration set by T-SN may be affected. This means the T-SN should be informed/contacted. This can be done in two ways: S-SN contacts MN, which contacts T-SN before forwarding the reconfiguration message to the UE (via SRB1); or S-SN contacts/communicates with T-SN directly (i.e. not via MN). In this case the S-SN builds the Reconfiguration message that can be forwarded to the UE via SRB3

Support is provided for direct communication between SNs, at least for the case S-SN changes the SCG configuration and needs to inform T-SN as the conditional reconfiguration set by T-SN may be affected. It is desirable to introduce direct communication between S-SN and T-SN because direct communication enables use of SRB3 and thereby reduces latency and MN involvement is only required upon initial configuration of a candidate on another SN.

Step 1a/1b could either be done by re-use of the existing MN-initiated SN Modification procedure, or by a new procedure (as shown in FIG. 5). The rest of the configuration sequence is similar to the one of CPA as shown in FIG. 5, although there are some small differences.

For instance, the MN provides the current SCG configuration to the target SN within the RRC internode messages CG-ConfigInfo that is included in the SN ADD REQ (Step/Msg 2 and 3). T-SN initiates status transfer towards MN, that subsequently contacts S-SN. If direct communication is introduced, as above, T-SN could use it for this procedure also i.e. contact S-SN directly rather than via MN.

Execution is shown in the lower part of FIG. 6, immediately above "2. Conditional SCG change, MN initiated: Execution"

The execution sequence is similar to the one of CPA (shown in FIG. 5), although there are some small differences, such as the MN initiates release of the connection with S-SN con (Msg 1)

There may also be a need to modify a prepared CPC candidate i.e. in-between configuration and execution. This can be initiated: by the MN as a change of MN generated configuration which may affect the S-SN generated SCG configuration as well as the T-SN generated configuration of the CPC candidate; by the S-SN as a change of SN generated SCG configuration may affect the T-SN generated configuration of the CPC candidate (as current SCG is used as baseline for T-SN generated configuration); or by the T-SN e.g. when there is a need to modify the T-SN generated configuration of the CPC candidate Further, the sequence/procedure for the 1st case i.e. the MN initiated modification is similar to the one for the initial reconfiguration. The sequence for the 2nd case i.e. the SN initiated modification may be similar to the SN initiated inter SN CPC configuration described below. The sequence for the 3rd case i.e. T-SN initiated case is similar to the known SN Modification procedure—SN initiated with MN involvement. Some changes are needed to reflect that the modification now concerns a candidate PSCell rather than an actually used SCG configuration FIG. 7 shows a message flow in connection with S-SN initiated inter SN change of PCell (SI-interCPC).

As indicated previously, the SN is responsible for SCG mobility and may initiate inter-SN change for this purpose. FIG. 7 shows an example of a message sequence for the case of SI-interCPC, covering both configuration and execution. Configuration is shown in the upper part of FIG. 7, immediately above "1 Conditional SCG Change, SN initiated: Configuration".

The configuration sequence is similar to the ones of CPA and MI-CPC, shown in FIGS. 5 and 6. However, there are some differences. The SN initiates the procedure by sending the SN CHANGE REQuired to the MN by Msg1.

Upon receiving the reconfiguration complete from the UE, the MN confirms successful configuration by the sending the SN CHANGE Confirm to S-SN by Msg. 6 (the message does not include embedded RRC message). Note that merely for reference, the figure shows an alternative signalling option corresponding with an alternative signalling structure.

In this alternative option, the MN contacts the S-SN prior to forwarding the Reconfiguration message to the UE (i.e. by step 3a/3b) In other words, in this alternative option, the final reconfiguration message carrying the conditional reconfiguration message is built by the S-SN.

This alternative approach makes it possible to support configuration of multiple candidates on the same T-SN by a single message/procedure i.e. the response of the T-SN is communicated back to the S-SN that can remove any CPC candidates that were not admitted by the T-SN. Such an operation is difficult to support by the MN, as it cannot really modify the S-SN generated information to take into account admission results from the T-SN, as it would require comprehension of the same.

The alternative signalling approach aligns with the Release 16 SI intra-SN CPC. In this alternative approach, it is however more difficult to support conditional reconfiguration for MN generated parameters as discussed above. Hence, a different approach is adopted.

Execution is shown in the lower part of FIG. 7, immediately above "2: Conditional SCG change, SN initiated: Execution".

The execution sequence is similar to the one of MI inter-SN CPC, described above, although there are some small differences. The S-SN initiates the procedure by sending the SN CHANGE REQUIRED msg that includes the current SCG configuration, the CPC candidate and the execution condition (that is generated by SN)

There may also be a need to modify a prepared CPC candidate i.e. in-between configuration and execution. These modifications are same as for MI-CPC, described previously.

The following part of the description deals with further details regarding the signalling associated with the aforementioned embodiments of the disclosure.

The following relates to RRC signalling i.e. Reconfiguration message structure used in case of CPA, MI-CPC and SI-CPC. As a consequence of the aforementioned, the conditionalReconfiguration of a candidate (i.e. RRC configuration for an entry of CondReconfigurationToAddModList) is generated by the MN. This applies for all 3 cases i.e. CPA, MI-CPC and SI-CPC. In the following, further signalling details are described, noting that in this case there are 3 message levels:

1st level: Outer Reconfiguration message generated by the MN, sent to the UE via SRB1, that includes conditional reconfigurations for one or more candidates by field conditionalReconfiguration 2nd level: RRC configuration of a conditional reconfiguration candidate, as contained in an entry of CondReconfigurationToAddModList (e.g. NR field condRRCConfig or LTE field condReconfigurationToApply)

3rd level: SN generated configuration covering both the RRC configuration of the concerned candidate and an execution condition (at least for SI inter-SN CPC)

The following table, Table 4, illustrates the signalling options, with level indicating the embedding level with 0 meaning top level i.e. no embedding.

TABLE 4

| Signalling Options | | |
|---|---|---|
| LLevel | Description | Remarks |
| 0 | RRC(Connection)Reconfiguration message generated by MN including field conditionalReconfiguration condReconfigId, condExecutionCond condExecutionConfig2 condReconfigType condRRCReconfig | Outer RRC(Connection)Reconfiguration message generated by MN that may include non-conditional changes, both MN and SN generated Separate octet string containers for: a) condRRCReconfig b) condExecutionConfig2 These are shown as level options 1a and 1b below Field condReconfigType indicates whether conditional reconfiguration concerns PCell or PSCell |
| 1a | RRC(Connection)Reconfiguration message generated by MN, including field(s): xx-SecondaryCellGroup, sk-Counter, pMaxEUTRA, radioBearerConfig1 (e.g. RB termination change), radioBearerConfig2 and MN configuration (capability coordination) | Includes MN generated fields as well as T-SN generated configurations i.e. xx-SecondaryCellGroup and possibly radioBearerConfig2 SN may generate radioBearerConfig for addition (CPA/CPC) or modification (CPC) of SN terminated DRBs, if supported. The radioBearerConfig generated by SN is either carried within xx-SecondaryCellGroup (i.e. within level option 2a below) or radioBearerConfigN (i.e. within 2b) |
| 1b | IE specifying executing condition generated by S-SN | Specified by one or more measIds, defined within S-SN measurement config. Seems appropriate to create new (extensible IE) mainly including sequence of executing conditions |
| 2a | RRCReconfiguration message generated by (T-SN, at least including field(s): secondaryCellGroup, otherConfig and measConfig. Might also include radioBearerConfig | |
| 2b | RadioBearerConfig generated by (T-)SN | Applicable if radioBearerConfig is not in 2a |

The RRC message in 1a above is MN generated so that both MN and SN generated reconfigurations can be performed upon execution of conditional reconfiguration for the case of CPA and inter-SN CPC (even if initiated by S-SN).

To support that the condition can be generated by the SN (and refer to the SN configured measurement config), a field is added by which the MN can transparently transfer the SN generated information (i.e. carried within an octet string container).

In accordance with the SN having a say in PSCell selection, the new field carrying the SN generated condition can also be used for MN initiated cases i.e. CPA and MI CPC i.e. to give SN a say in the PSCell decision In relation to determination of the conditional reconfiguration type, a field may be introduced by which the network can indicate the conditional configuration type i.e. whether the candidate concerns a PCell or PSCell.

Shown below are ASN. 1 changes for the case of MN uses LTE i.e. (NG)EN-DC:

Extract From 36.331

The IE CondReconfigurationToAddModList concerns a list of conditional reconfigurations (i.e. conditional handover) to add or modify, for each entry the measId (associated to the triggering condition configuration) and the associated RRCConnectionReconfiguration.

CondReconfigurationToAddModList Information Element

```
-- ASN1START
CondReconfigurationToAddModList-r16 ::= SEQUENCE (SIZE (1..
maxCondConfig- r16)) OF CondReconfigurationAddMod-r16
CondReconfigurationAddMod-r16 ::= SEQUENCE {
    condReconfigurationId-r16       CondReconfigurationId-r16,
    triggerCondition-r16            SEQUENCE (SIZE (1..2)) OF
                                    MeasId
                                        OPTIONAL,   -- Cond
CondReconfigurationAdd
    condReconfigurationToApply-r16  OCTET STRING (CONTAINING
RRCConnectionReconfiguration)
                                        OPTIONAL,-- Cond
CondReconfigurationAdd
    ...
    triggerCondition2-r17           OCTET STRING   OPTIONAL,
    condReconfigType-r17            ENUMERATED {pcell}
                                    OPTIONAL,
}
-- ASN1STOP
```

CondReconfigurationToAddMod field descriptions condReconfigurationToApply
The RRCConnectionReconfiguration message to be applied when the condition(s) are fulfilled.
condReconfigType
Indicates whether the conditionalReconfigurationToAddMod concerns a PSCell or PSCell. The field is absent for CHO and intra SN CPC defined in R16. Absence of the field is used to indicate PCell.
triggerCondition
The condition that needs to be fulfilled in order to trigger the execution of a conditional reconfiguration.
triggerCondition2
A condition that SN may configure and that, if configured, needs to be fulfilled in order to trigger the execution of a conditional reconfiguration. Contains the NR information element CondReconfigExecCond as specified in TS 38.331 [82]

| Conditional presence | Explanation |
| --- | --- |
| CondReconfigurationAdd | The field is mandatory present if a condReconfigurationId is being added. Otherwise it is optional, need ON. |

Extract From 38.331
CondReconfigToAddModList Information Element

```
-- ASN1START
-- TAG-CONDRECONFIGTOADDMODLIST-START
    CondReconfigToAddModList-r16 ::= SEQUENCE (SIZE (1..
maxnrofCondCells-r16)) OF CondReconfigToAddMod-r16
CondReconfigToAddMod-r16 ::=          SEQUENCE {
    condReconfigId-r16                CondReconfigId-r16,
    condExecutionCond-r16             SEQUENCE (SIZE
                                      (1..2)) OF MeasId OPTIONAL,  -- Cond condReconfigAdd
    condRRCReconfig-r16                           OCTET STRING
(CONTAINING RRCReconfiguration)       OPTIONAL,   -- Cond
                                      condReconfigAdd
    ...
}
CondReconfigExecCond-r17 ::=          SEQUENCE {
    condExecutionCond-r17             SEQUENCE (SIZE
                                      (1..2)) OF MeasId OPTIONAL,  -- Cond condReconfigAdd
    ...
}
-- TAG-CONDRECONFIGTOADDMODLIST-STOP
-- ASN1STOP
```

FIG. 7 showed an alternative signalling option in which the S-SN builds the final message towards UE and a related note provided further background. The following includes some enhancements related to that approach.

The following enhancements for the alternative SI inter-SN CPC signalling option in which S-SN builds the final message to be signalled to the UE (SI-CPC) may be utilised. Existing parameters in the outer Reconfiguration message may be re-used. i.e. the concerned parameters are pre-configured and taken into use when the UE is provided with a configuration in which these become relevant. An example parameter for which this option may be used concerns sk-Counter. It may be taken into use when (the concerned or any) CPC is executed. Within the conditional Configuration, for a candidate (as specified by CondReconfigToAddMod), separate fields for MN and SN generated information may be included. Octet string containers may be used for the MN generated parameters.

The following includes an overview of the changes to the signalling exchanged between network nodes, covering both RRC inter-node messages and RAN3 defined signalling. CG-ConfigInfo

TABLE 5

| Case | Inside | Change | Remarks |
|---|---|---|---|
| CPA | 1: SN Add Req't | MN may provide information enabling SN to have a say in the PSCell selection e.g. facilitating negotiation of the condition | |
| | 2: SN Reconfig Comp | None i.e. same as in regular non conditional case, except that possibly a. new failure type/ information may be defined | Returned in case of failure. (In case of success, RRC ReconfigurationComplete message is included) |
| MI inter-SN CPC | 1a: SN Change Prepare/SN Mod Req'd | Field to inform S-SN about MI inter-SN CPC. Might be done by RAN3 signalling i.e. CPC info | |
| | 1: SN Add Req't | Same as for CPA | See CPA |
| SI inter-SN CPC | 6: SN Cha Cfm | None i.e. same as in regular non conditional case | |

CG-Config

TABLE 6

| Case | Inside | Change | Remarks |
|---|---|---|---|
| CPA | 1: SN Add Req't Ack | SN may provide information to assist negotiation of the condition/ an additional SN conditionIndication | |
| MI inter-SN CPC | 1b: SN Change Prep Ack/SN Mod Req'd Ack | None (Current standards support signalling of SCG configuration) | |
| | 2: SN Add Req't Ack | Same as for CPA | See CPA |
| SI inter-SN CPC | 1: SN Cha Req | Additional field for SN generated condition | Existing field for indicating candidate cells may be used, but will include a single entry |

Other/RAN3 signalling

TABLE 7

| Case | Inside | Change | Remarks |
|---|---|---|---|
| CPA | 1: SN Add Req't | CPC info e.g. trigger type (initial, modification), estimated arrival probability and T-SN assigned UE-ID (modification) | |
| | 2: SN Add Req't Ack | CPC info e.g. requested target cell ID, max nr. of CPC preparations | |
| MI inter-SN CPC | 1a: SN Change Prepare/SN Mod Req'd | Field to inform S-SN about MI inter-SN CPC (unless covered by CG-ConfigInfo) | |
| SI inter-SN CPC | 1: SN Cha Req | CPC information i.e similar to what is in 1: SN Add Req't for CPA | |
| | 6: SN Cha Cfm | CPC information i.e similar to what is in 1: SN Add Req't Ack for CPA | |

Figure 8:
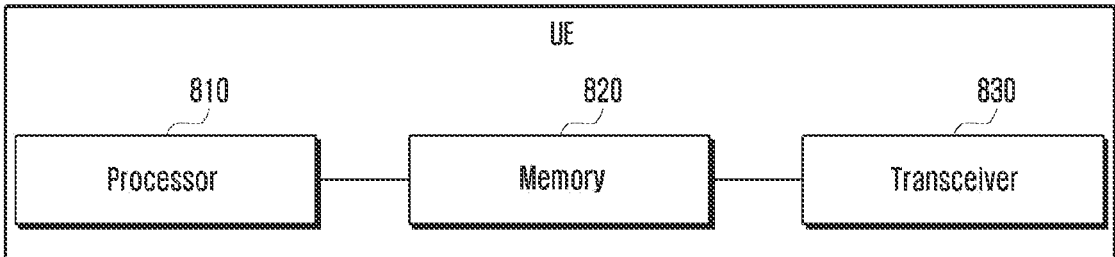
FIG. 8 illustrates a user equipment (UE) according to embodiments of the present disclosure.

FIG. 8 illustrate a user equipment (UE) according to embodiments of the present disclosure.

Referring to the FIG. 8, the UE may include a processor 810, a memory 820 and a transceiver 830. However, all of the illustrated components are not essential. The UE may be implemented by more or less components than those illustrated in FIG. 8. In addition, the processor 810 and the transceiver 830 and the memory 820 may be implemented as a single chip according to another embodiment.

The UE may correspond to UE described above.

The aforementioned components will now be described in detail.

The processor 810 may include one or more processors or other processing devices that control the proposed function, process, and/or method. Operation of the UE may be implemented by the processor 810.

The transceiver 830 may include a RF transmitter for up-converting and amplifying a transmitted signal, and a RF receiver for down-converting a frequency of a received signal. However, according to another embodiment, the transceiver 830 may be implemented by more or less components than those illustrated in components.

The transceiver 830 may be connected to the processor 810 and transmit and/or receive a signal. The signal may include control information and data. In addition, the transceiver 830 may receive the signal through a wireless channel and output the signal to the processor 810. The transceiver 830 may transmit a signal output from the processor 810 through the wireless channel.

The memory 820 may store the control information or the data included in a signal obtained by the UE. The memory

820 may be connected to the processor 810 and store at least one instruction or a protocol or a parameter for the proposed function, process, and/or method. The memory 820 may include read-only memory (ROM) and/or random access memory (RAM) and/or hard disk and/or CD-ROM and/or DVD and/or other storage devices.

Figure 9:
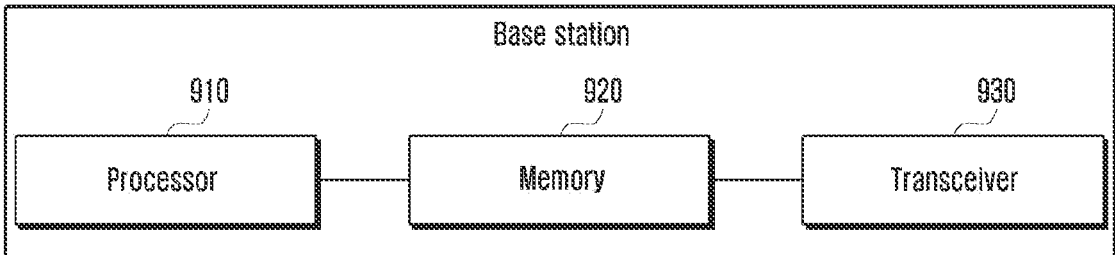
FIG. 9 illustrates a base station according to embodiments of the present disclosure.

FIG. 9 illustrates a base station according to embodiments of the present disclosure.

Referring to the FIG. 9, the base station may include a processor 910, a transceiver 930 and a memory 920. However, all of the illustrated components are not essential. The base station may be implemented by more or less components than those illustrated in FIG. 9. In addition, the processor 910 and the transceiver 930 and the memory 920 may be implemented as a single chip according to another embodiment.

The base station may correspond to the MeNB or SgNB described above.

The aforementioned components will now be described in detail.

The processor 910 may include one or more processors or other processing devices that control the proposed function, process, and/or method. Operation of the base station may be implemented by the processor 910.

The transceiver 930 may include a RF transmitter for up-converting and amplifying a transmitted signal, and a RF receiver for down-converting a frequency of a received signal. However, according to another embodiment, the transceiver 930 may be implemented by more or less components than those illustrated in components.

The transceiver 930 may be connected to the processor 910 and transmit and/or receive a signal. The signal may include control information and data. In addition, the transceiver 930 may receive the signal through a wireless channel and output the signal to the processor 910. The transceiver 930 may transmit a signal output from the processor 910 through the wireless channel.

The memory 920 may store the control information or the data included in a signal obtained by the base station. The memory 920 may be connected to the processor 910 and store at least one instruction or a protocol or a parameter for the proposed function, process, and/or method. The memory 920 may include read-only memory (ROM) and/or random access memory (RAM) and/or hard disk and/or CD-ROM and/or DVD and/or other storage devices.

Although this disclosure has been described with an exemplary embodiment, various changes and modifications may be suggested to one skilled in the art. It is intended that this disclosure encompass such changes and modifications as fall within the scope of the appended claims.

Note that in most cases a given message exchanged between network nodes includes either conditional or non-conditional reconfiguration related information. However, as as exception, if the MN changes its configuration and notifies SN as both current SCG configuration and any conditional configurations may be affected. The response from the SN may include both non-conditional and conditional reconfigurations.

Embodiments of the disclosure introduce a number of conditional reconfiguration cases, having advantages over the prior art. In particular, the embodiments follow as closely as possible what is defined for the non-conditional variant, re-use the general principles of the existing, prior art, conditional reconfiguration cases and result in a consistent and not overly complex solution.

Embodiments of the disclosure relate to a signalling approach developed mainly with the most difficult case of SI Inter-SN CPC in mind but useable for the other cases set out above also. Although the solution is not entirely consistent with Release 16 CPC, while the target SN may not support the same control of the PSCell decision, the embodiments presented herein are considered the best option for meeting the above objectives.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a master node in a wireless communication network with dual connectivity, the method comprising:

transmitting, to a user equipment (UE), a message including information on a conditional reconfiguration, wherein the information on the conditional reconfiguration includes an execution condition associated with a secondary cell group (SCG);

receiving, from the UE, UE assistance information associated with SCG deactivation;

receiving, from a secondary node (SN), an SN modification required message including configuration information on the SCG;

transmitting, to the SN, an SN modification request message including information on SCG activation; and transmitting, to the UE, a radio resource control (RRC) message including deactivated SCG configuration information.

2. The method of claim 1, wherein the UE assistance information is received via a signaling radio bearer 1 (SRB1).

3. The method of claim 1, wherein the UE assistance information includes assistance information on overheating, assistance information on power saving, or assistance information on in-device coexistence (IDC).

4. The method of claim 1, further comprising:

receiving, from the SN, an SN modification request acknowledgement message including a configuration for a deactivated SCG.

5. The method of claim 1, wherein the UE assistance information indicates that the UE wants the SCG to be deactivated.

6. The method of claim 1, wherein the execution condition includes a measurement configuration associated with the SCG.

7. The method of claim 6, wherein the conditional reconfiguration is associated with an inter-SN conditional primary SCG cell (PSCell) change initiated by the SN.

8. The method of claim 1, wherein in case that the execution condition is met, the conditional reconfiguration is performed.

9. A master node in a wireless communication network with dual connectivity, the master node comprising:

a transceiver; and a processor operably coupled to the transceiver and configured to:

transmit, to a user equipment (UE), a message including information on a conditional reconfiguration, wherein the information on the conditional reconfiguration includes an execution condition associated with a secondary cell group (SCG), receive, from the UE, UE assistance information associated with SCG deactivation, receive, from a secondary node (SN), an SN modification required message including configuration information on the SCG, transmit, to the SN, an SN modification request message including information on SCG activation, and transmit, to the UE, a radio resource control (RRC) message including deactivated SCG configuration information.

10. The master node of claim 9, wherein the UE assistance information is received via a signalling radio bearer 1 (SRB1).

11. The master node of claim 9, wherein the UE assistance information includes assistance information on overheating, assistance information on power saving, or assistance information on in-device coexistence (IDC).

12. The master node of claim 9, wherein the UE assistance information indicates that the UE wants the SCG to be deactivated.

13. The master node of claim 9, wherein the execution condition includes a measurement configuration associated with the SCG.

14. The master node of claim 13, wherein the conditional reconfiguration is associated with an inter-SN conditional primary SCG cell (PSCell) change initiated by the SN.

15. The master node of claim 9, wherein in case that the execution condition is met, the conditional reconfiguration is performed.

16. A method performed by a user equipment (UE) in a wireless communication network with dual connectivity, the method comprising:

receiving, from a master node, a message including information on a conditional reconfiguration, wherein the information on the conditional reconfiguration includes an execution condition associated with a secondary cell group (SCG);

transmitting, to the master node, UE assistance information associated with SCG deactivation; and receiving, from the master node, a radio resource control (RRC) message including deactivated SCG configuration information, wherein the UE assistance information is for determination of whether to deactivate the SCG.

17. The method of claim 16, further comprising:

identifying whether the execution condition is met, wherein the UE assistance information is transmitted via a signalling radio bearer 1 (SRB1), and wherein the execution condition includes a measurement configuration associated with the SCG.

* * * * *